United States Patent
Huang

(10) Patent No.: US 9,564,103 B2
(45) Date of Patent: Feb. 7, 2017

(54) IMAGE PROCESSING CIRCUIT AND METHOD THEREOF

(71) Applicant: Acer Incorporated, New Taipei (TW)

(72) Inventor: Xiang-Ting Huang, New Taipei (TW)

(73) Assignee: Acer Incorporated, New Taipei (TW)

( * ) Notice: Subject to any disclaimer, the term of this patent is extended or adjusted under 35 U.S.C. 154(b) by 189 days.

(21) Appl. No.: 14/504,440

(22) Filed: Oct. 2, 2014

(65) Prior Publication Data

US 2015/0213781 A1 Jul. 30, 2015

(30) Foreign Application Priority Data

Jan. 24, 2014 (TW) .............................. 103102710 A

(51) Int. Cl.
  *G09G 5/10* (2006.01)
  *G09G 5/06* (2006.01)
  *G06F 1/32* (2006.01)

(52) U.S. Cl.
  CPC ............... *G09G 5/10* (2013.01); *G06F 1/3212* (2013.01); *G06F 1/3265* (2013.01); *G09G 5/06* (2013.01); *G09G 2320/0646* (2013.01); *G09G 2320/0673* (2013.01); *G09G 2320/08* (2013.01); *G09G 2330/021* (2013.01); *G09G 2360/144* (2013.01);
  (Continued)

(58) Field of Classification Search
  CPC ............... G09G 2320/0646; G09G 2320/0673; G09G 3/3406; G09G 2320/0626; G09G 2320/0653; G09G 2320/0233; G09G 2320/0693; G09G 2320/0285; G09G 5/10; G09G 2320/041; G09G 2320/062
  See application file for complete search history.

(56) References Cited

U.S. PATENT DOCUMENTS

| 2010/0053222 A1* | 3/2010 | Kerofsky | G09G 3/3406 345/690 |
| 2010/0120471 A1* | 5/2010 | Uchikawa | G09G 3/3406 455/566 |
| 2013/0147864 A1* | 6/2013 | Kim | G09G 3/3607 345/691 |

FOREIGN PATENT DOCUMENTS

| CN | 101246675 | 8/2008 |
| CN | 101419778 | 4/2009 |
| CN | 101620819 | 1/2010 |

(Continued)

OTHER PUBLICATIONS

"Office Action of China Counterpart Application", issued on Nov. 28, 2016, p1-p8, in which the listed references were cited.

*Primary Examiner* — Kent Chang
*Assistant Examiner* — Scott Au
(74) *Attorney, Agent, or Firm* — Jianq Chyun IP Office

(57) ABSTRACT

An image processing circuit and a method thereof. The image processing circuit includes a light sensor, an image control unit, a Gamma curve LUT, a backlight control unit and an image processing unit. The light sensor senses an intensity of ambient light and outputs an intensity signal. The image control unit receives an image signal and determines an image luminance value corresponding to a first image data of the image signal according to the intensity signal. The Gamma curve LUT outputs a luminance value signal corresponding to the image luminance value. The backlight control unit outputs a backlight luminance signal corresponding to the image luminance value. The image processing unit outputs a second image data corresponding to the first image data according to the luminance value signal and the backlight luminance signal.

24 Claims, 6 Drawing Sheets

(52) U.S. Cl.
CPC ......... *Y02B 60/1242* (2013.01); *Y02B 60/1292* (2013.01)

(56) References Cited

FOREIGN PATENT DOCUMENTS

| | | |
|---|---|---|
| CN | 101635126 | 1/2010 |
| CN | 102355561 | 2/2012 |
| JP | 2002232740 | 8/2002 |
| TW | 200907924 | 2/2009 |
| TW | 201248604 | 12/2012 |
| WO | 2010039632 | 11/2010 |

\* cited by examiner

IMAGE PROCESSING CIRCUIT AND METHOD THEREOF

CROSS-REFERENCE TO RELATED APPLICATION

This application claims the priority benefit of Taiwan application serial no. 103102710, filed on Jan. 24, 2014. The entirety of the above-mentioned patent application is hereby incorporated by reference herein and made a part of this specification.

BACKGROUND OF THE INVENTION

Field of the Invention

The invention generally relates to a display technology, and more particularly, to an image processing circuit and a method thereof.

Description of Related Art

For the current electronic products, in order to allow users viewing frames displayed on a screen under different ambient light sources, a light sensor is employed in most of the electronic products for sensing the ambient light variation around the electronic products so as to adjust the backlight luminance of the screen. When the ambient light intensity is excessive around a user (for example, an electronic produce used outdoors), the specular light from the screen of the electronic product may be stronger than the image luminance displayed by the screen. At the time, the user may see the ambient scene reflected by the screen and fails to clearly see the displayed frame. In particular, when the frame content displayed by the screen is relatively dark, the problem for the user to clearly see the frame becomes more serious. Hence, the current scheme is to increase the backlight luminance of the screen to reduce the specular light by the screen. However, the aforementioned scheme is power-consumed considerably and unable to make the frame clear enough, which triggers an important issue of the display technology that how to make the frame display out of the influence of ambient light.

SUMMARY OF THE INVENTION

Accordingly, the invention is directed to an image processing circuit and a method thereof which can adaptably adjust the image luminance according to the ambient light source so as to advance the image quality.

The image processing circuit of the invention is suitable for an electronic device and includes a light sensor, an image control unit, a Gamma curve look-up table (Gamma curve LUT), a backlight control unit and an image processing unit. The light sensor is configured to sense an intensity of ambient light and output an intensity signal. The image control unit is coupled to the light sensor and receives an image signal, wherein the image control unit determines an image luminance value corresponding to a first image data of the image signal according to the intensity signal. The Gamma curve LUT is coupled to the image control unit and controlled by the image control unit to output a luminance value signal corresponding to the image luminance value. The backlight control unit is coupled to the image control unit and controlled by the image control unit to output a backlight luminance signal corresponding to the image luminance value. The image processing unit is coupled to the Gamma curve LUT and the backlight control unit to output a second image data corresponding to the first image data according to the luminance value signal and the backlight luminance signal.

The image processing method of the invention is suitable for an electronic device and includes following steps: sensing the intensity of ambient light and outputting an intensity signal; receiving an image signal and determining the image luminance value corresponding to the first image data of the image signal according to the intensity signal; outputting a luminance value signal corresponding to the image luminance value; outputting a backlight luminance signal corresponding to the image luminance value; outputting a second image data corresponding to the first image data according to the luminance value signal and the backlight luminance signal.

Based on the depiction above, the image processing circuit and the method thereof in the invention can adaptably determine the image luminance value of the image signal according to the intensity of ambient light source. In addition, the image processing circuit and the method thereof provided by the invention can increase the image quality displayed by the screen of an electronic device through adjusting the backlight luminance of the screen and the color saturation of the image signal. On the other hand, the image processing circuit and the method thereof in the invention can determine the image luminance value of the image signal according to the different power operations of the electronic device. In this way, the image processing circuit and the method thereof in the invention can solve the problem for the user to fail clearly viewing the displayed content on the screen of the electronic device under a strong light and advance the quality of the display frame.

In order to make the features and advantages of the present invention more comprehensible, the present invention is further described in detail in the following with reference to the embodiments and the accompanying drawings.

BRIEF DESCRIPTION OF THE DRAWINGS

The accompanying drawings are included to provide a further understanding of the invention, and are incorporated in and constitute a part of this specification. The drawings illustrate embodiments of the invention and, together with the description, serve to explain the principles of the invention.

DESCRIPTION OF THE EMBODIMENTS

Figure 1:
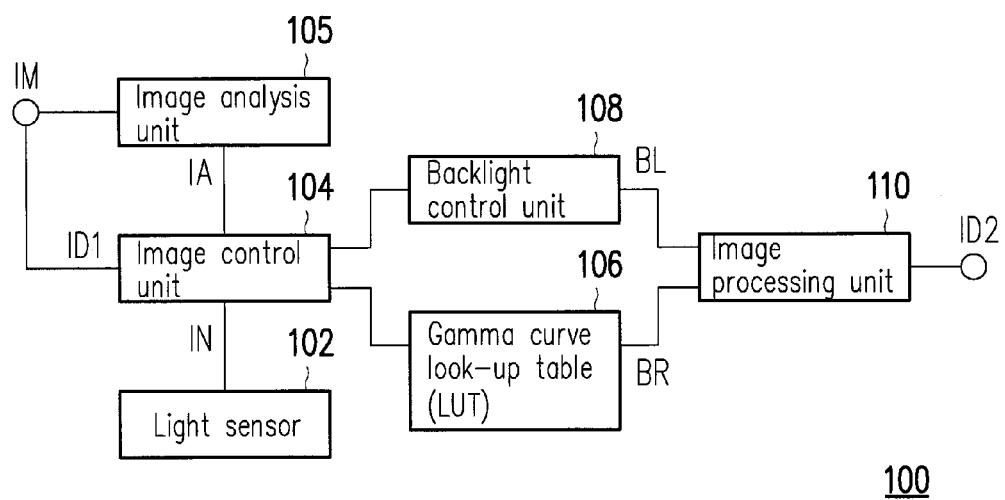
FIG. 1 is a schematic diagram of an image processing circuit in an embodiment of the invention.

FIG. 1 is a schematic diagram of an image processing circuit 100 in an embodiment of the invention. The image processing circuit 100 is suitable for an electronic device such as a smart phone, a personal digital assistant phone (PDA phone) or a table PC. The image processing circuit 100 includes a light sensor 102, an image control unit 104, an image analysis unit 105, a Gamma curve LUT 106, a backlight control unit 108 and an image processing unit 110.

The light sensor 102 is configured to sense the intensity of ambient light source around an electronic device and accordingly output an intensity signal IN, and the light sensor 102 is, for example, a photo diode, a phototransistor or other electronic components having a light-sensing function. When the user operates the electronic device outdoors, the ambient light source sensed by the light sensor 102 is stronger, i.e., at the time, the light sensor 102 senses a light source with high intensity; when the user operates the electronic device in doors, the ambient light source sensed by the light sensor 102 is weaker, i.e., at the time, the light sensor 102 senses a light source with low intensity. Accordingly, the light sensor 102 outputs different intensity signals IN corresponding to different intensities of ambient light source.

The image analysis unit 105, after receiving an image signal IM (for example, received at the input terminal of an electronic device), would analyze the image distribution of the image signal IM and accordingly provide an image analysis signal IA to the image control unit 104. The image analysis signal IA herein is, for example, an image grayscale histogram of the image signal IM or an average grayscale of the image signal IM.

The image control unit 104 is coupled to the light sensor 102 to receive the intensity signal IN and coupled to the image analysis unit 105 to receive the image analysis signal IA. In the embodiment, the image control unit 104 would determine the image processing way of a first image data ID1 of the image signal IM according to the intensity signal IN. For example, the image control unit 104 can use the intensity signal IN and/or the image analysis signal IA to determine the image luminance value corresponding to the first image data ID1 of the image signal IM according to the intensity signal IN.

When the image control unit 104 uses the intensity signal IN to determine the image luminance value corresponding to the first image data ID1 of the image signal IM, the image control unit 104 would determine the image luminance value of the image data according to the just noticeable difference (JND). That is, the image control unit 104 can adjust the luminance value corresponding to each of the grayscale values according to the intensity of ambient light source so that a plurality of low-luminance grayscale values can be clearly identified, in which the adjusted grayscale value is the image luminance value corresponding to each of the image data (for example, ID1). Assuming the grayscale value range is 0-255, the aforementioned grayscale value can be the one among the grayscale values of 32±4.

When the image control unit 104 uses the image analysis signal IA to determine the image luminance value corresponding to the first image data ID1 of the image signal IM, the image control unit 104 would judge the image type of an image delivered by the image signal IM according to the image analysis signal IA so as to determine the processing way of the image signal IM. For example, when the image control unit 104 judges out the image signal IM delivers a high-luminance image, i.e., most of the image data of the image signal IM are corresponding to high-luminance grayscale values (for example, grayscale values of 171-255), the image control unit 104 would advance the luminance difference between the high-luminance grayscale values to make the high-luminance image clear; when the image control unit 104 judges out the image signal IM delivers a middle-luminance image, i.e., most of the image data of the image signal IM are corresponding to middle-luminance grayscale values (for example, grayscale values of 86-170), the image control unit 104 would advance the luminance difference between the middle-luminance grayscale values; when the image control unit 104 judges out the image signal IM delivers a low-luminance image, i.e., most of the image data of the image signal IM are corresponding to low-luminance grayscale values (for example, grayscale values of 0-85), the image control unit 104 would advance the luminance difference between the low-luminance grayscale values.

Then, the image control unit 104 is coupled to the Gamma curve LUT 106 and the backlight control unit 108 to control the Gamma curve LUT 106 and the backlight control unit 108 respectively outputting a luminance value signal BR and a backlight luminance signal BL corresponding to the determined image luminance value of the image control unit 104. The image processing unit 110 is coupled to the Gamma curve LUT 106 and the backlight control unit 108 and outputs a second image data ID2 corresponding to the first image data ID1 according to the luminance value signal BR and the backlight luminance signal BL. The image processing circuit 100 herein can adjust the luminance of the backlight module of the electronic device through the backlight luminance signal BL output from the backlight control unit 108 and find out the Gamma curve corresponding to the image signal IM through the Gamma curve LUT 106. As a result, the user can clearly view the content displayed by the screen of the electronic device under different ambient light sources.

In an embodiment of the invention, the image processing circuit 100 can determine the processing mode of the image signal IM according to whether or not the electronic device is operated under an external power and determine the luminance-adjusting way of the image signal IM according to the corresponding processing mode so as to determine the image luminance value corresponding to the image signal IM. In other words, the image processing circuit 100 can firstly judge the electronic device is presently operated by the battery power of the electronic device or the external power so as to further determine the processing mode of the image signal IM.

First, assuming the electronic device has no external power, i.e., the electronic device is operated by the battery power of the electronic device, and at the time, the image processing circuit 100 is operated in a DC power mode. Then, when the light sensor 102 senses out the intensity of ambient light source is greater than or equal to a first threshold value (for example, 800 lux), it means the user uses the electronic device outdoors or nearby window. At the time, the image control unit 104 can find out the Gamma curve corresponding to the present intensity signal IN by controlling the Gamma curve LUT 106, so that the image signal IM after adjusting (i.e., the image signal is composed of a plurality of second image data ID2) has JND, i.e., the image control unit 104 can determine the image luminance value corresponding to the first image data ID1 of the image signal IM according to the intensity signal IN so that the grayscale value corresponding to the second image data ID2 (i.e., the adjusted luminance value) are different from the grayscale value corresponding to the first image data ID1 (i.e., the original grayscale value).

Figure 2A:
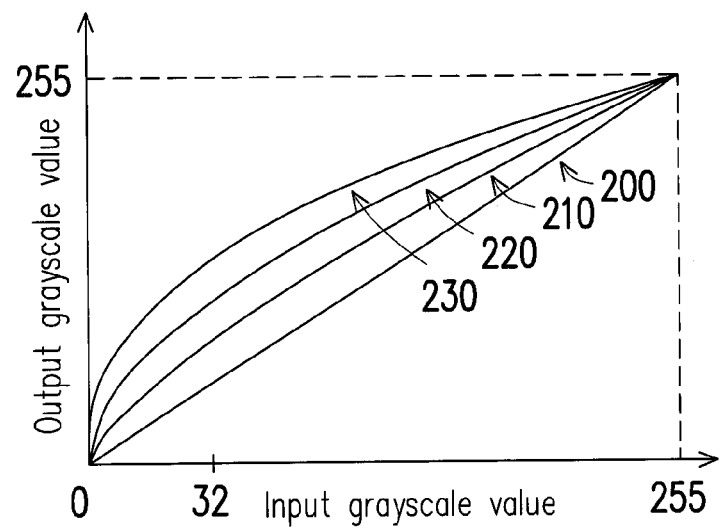
FIGS. 2A-2D are diagrams respectively showing the adjustment of the grayscale value of an image signal in an embodiment of the invention.

FIG. 2A is a diagram showing the grayscale value of an image signal IM under different ambient light sources in an embodiment of the invention. Referring to FIGS. 1 and 2A, in the embodiment, assuming the grayscale value range is 0-255, the abscissa of FIG. 2A represents the input grayscale value corresponding to the image signal IM and the ordinate of FIG. 2A represents the output grayscale value corresponding to the image signal IM, wherein the curve 200 represents an unadjusted Gamma curve (i.e., the original Gamma curve), while the curves 201, 202 and 203 respectively represent the Gamma curves corresponding to 3000 lux, 5000 lux and 8000 lus of intensities of ambient light source. Based on the depiction above, the higher the intensity of ambient light source, the more the amplitude to be adjusted of the image signal IM is so that all the images in low-luminance grayscale values (for example, among the grayscale values of 32±4) can be clearly identified.

When the light sensor 102 senses out the intensity of ambient light is less than the first threshold value, it means the user uses the electronic device indoors without the disturbance of ambient light, so that at the time the image control unit 104 will not adjust the luminance value of the first image data ID1, i.e., the grayscale value corresponding to the second image data ID2 (i.e., the adjusted grayscale value) are the same as the grayscale value corresponding to the first image data ID1 (i.e., the original grayscale value). For example, when the user uses the electronic device indoors with an un-strong ambient light source, the user has no problem of hard viewing the screen frame due to a disturbance of ambient light. In other words, the image processing circuit 100 does not process the image signal IM, but directly outputs the image signal IM. At the time, in order to save the power consumption of the electronic device, the image processing circuit 100 can be set to a low-consumption mode (such as off state or sleep mode).

On the other hand, assuming the electronic device receives an external power source, i.e., the electronic device is operated relying on the external power. At the time, the image processing circuit 100 can be set to an AC power mode. Then, when the intensity of ambient light sensed by the light sensor 102 is less than the first threshold value, which represents the user uses the electronic device indoors without the disturbance of ambient light, so that at the time the image control unit 104 will not adjust the luminance value of the first image data ID1 according to the intensity signal IN, but determines the image luminance value corresponding to the first image data ID1 of the image signal IM according to the image analysis signal IA so as to advance the image quality.

Figure 2B:
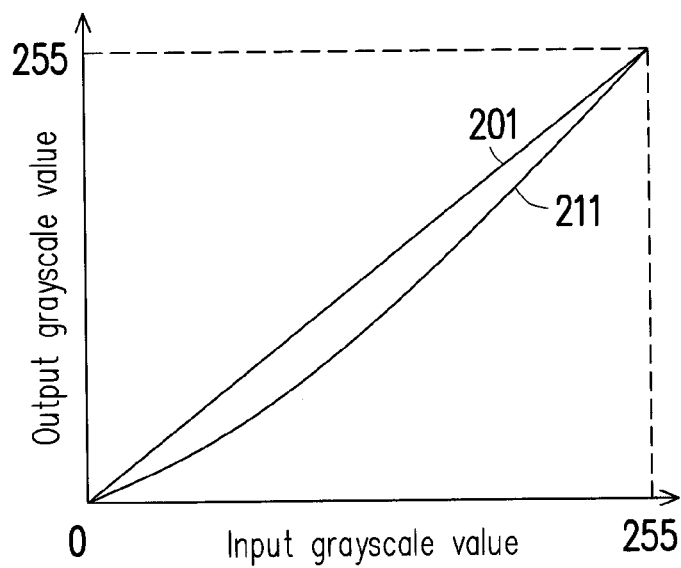
Figure 2C:
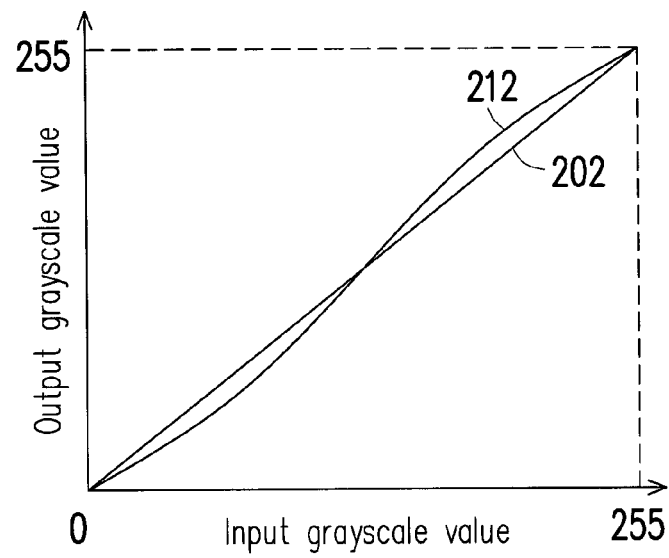
Figure 2D:
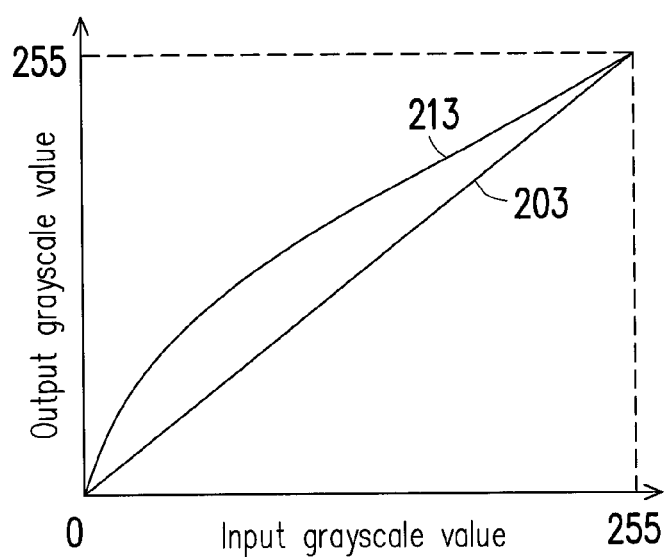

Moreover, the image processing circuit 100 can be aware of the image type of the image delivered by the image signal IM according to the image analysis signal IA provided by the image analysis unit 105 and can adjust the image luminance value corresponding to the first image data ID1 of the image signal IM according to the image type of the image signal IM. FIGS. 2B-2D are diagrams respectively showing the adjustment of the grayscale value of an image signal in an embodiment of the invention. Referring to FIGS. 1 and 2B-2D, the abscissa of FIGS. 2B-2D respectively represents the input grayscale value corresponding to the image signal IM and the ordinate thereof represents the output grayscale value corresponding to the image signal IM. In FIGS. 2B-2D, the curves 201, 202 and 203 represent the unadjusted Gamma curves and the curves 211, 212 and 213 represent the adjusted Gamma curves.

When the image signal IM is a high-luminance image, the image control unit 104 would determine the image luminance value corresponding to the first image data ID1 of the image signal IM according to the curve 211 so that the image control unit 104 increases the luminance difference between a plurality of high-luminance grayscale values of the image signal IM (for example, the grayscale values of 171-255), which makes the contrast of the high-luminance portions in the image more noticeable so as to further increase the detail performance of the high-luminance grayscales; when the image signal IM is a middle-luminance image, the image control unit 104 would determine the image luminance value corresponding to the first image data ID1 of the image signal IM according to the curve 212 so that the image control unit 104 increases the luminance difference between a plurality of middle-luminance grayscale values of the image signal IM (for example, the grayscale values of 86-170), which makes the contrast of the middle-luminance portions in the image more noticeable so as to further increase the detail performance of the middle-luminance grayscales; when the image signal IM is a low-luminance image, the image control unit 104 would determine the image luminance value corresponding to the first image data ID1 of the image signal IM according to the curve 213 so that the image control unit 104 increases the difference between a plurality of low-luminance grayscale values of the image signal IM (for example, the grayscale values of 0-85), which makes the contrast of the low-luminance portions in the image more noticeable so as to further increase the detail performance of the low-luminance grayscales.

When the light sensor 102 senses out the intensity of ambient light is greater than or equal to the first threshold value but less than the second threshold value (for example, 2000 lux), it means the user uses the electronic device nearby window or door, i.e., the present ambient light source is affected by the outdoor and indoor light sources to vary continuously. At the time, since the operation situation of the electronic device is changed from indoors to outdoors, for the smoothness of the image displaying, the image processing circuit 100 can take both the ambient light source and the image type of the image signal IM into consideration for determining the processing way of the image signal. That is, the image control unit 104 can determine the image luminance values corresponding to the first image data ID1 of the image signal IM respectively according to the intensity signal IN (corresponding to the ambient light source) and the image analysis signal IA (corresponding to the image type of the image signal IM). Then, it calculate an image gain values GAL corresponding to the luminance values determined by the intensity signal IN and the image analysis signal IA to select the luminance value determined by the intensity signal IN or the luminance value determined by the image analysis signal IA as the image luminance value corresponding to the first image data ID1 of the image signal IM, wherein the image control unit 104 can take the luminance value corresponding to the larger one among the image gain values GAL as the image luminance value corresponding to the first image data ID1 of the image signal IM.

Figure 3:
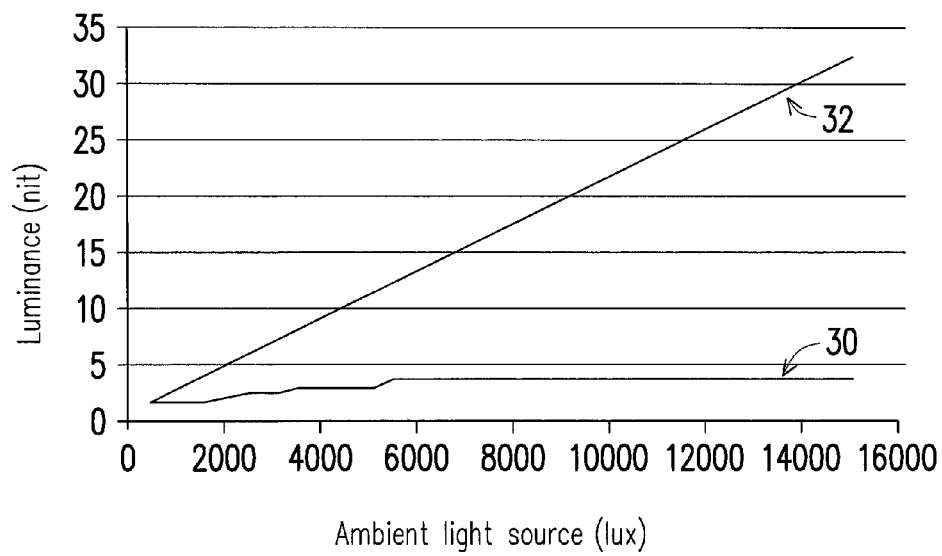
FIG. 3 is a schematic diagram showing different luminance curves of an image signal under different ambient light sources in an embodiment of the invention.

In following, the method for determining the image gain value GAL is explained. FIG. 3 is a schematic diagram showing different luminance curves of an image signal under different ambient light sources in an embodiment of the invention. Referring to FIG. 3, the abscissa of FIG. 3 represents the ambient light source (unit is lux) and the ordinate thereof represents the luminance (unit is nit) corresponding to the specific grayscale value (for example, grayscale value of 32). In FIG. 3, the curve 30 represents the curve of original luminance of the specific grayscale value (for example, grayscale value of 32) and the curve 32 represents the curve of luminance of the adjusted specific grayscale value (for example, grayscale value of 32). The relation between the curves 30 and 32 is given by the following formula:

$$(OGA/OGM)^{GAL} = (OGA'/OGM)$$

Wherein OGM is a maximal grayscale value of the image signal IM (for example, grayscale value of 255), OGA is arbitrary grayscale value of the image signal IM (for example, a low-luminance grayscale value of 32) which is unequal to the maximal grayscale value of the image signal IM (for example, grayscale value of 255) and OGA' is adjusted grayscale value of the image signal IM (for example, the curve 32).

On the other hand, when the light sensor 102 senses out the intensity of ambient light is greater than or equal to the second threshold value, it means the user uses the electronic device outdoors. At the time, the image control unit 104 would find out a Gamma curve corresponding to the present intensity signal IN by controlling the Gamma curve LUT 106 so that the image signal IM after adjusting (i.e., the image signal composed of a plurality of second image data ID2) has JND. At the time, the image control unit 104 can determine the image luminance value corresponding to the first image data ID1 of the image signal IM according to the intensity signal IN so that the grayscale value corresponding to the second image data ID2 (i.e., the adjusted luminance value) is different from the grayscale value corresponding to the first image data ID1 (i.e., the original grayscale value).

It is clear when the electronic device is operated relying on the external power, image control unit 104 would determine the image luminance value of the image signal IM according to the relation between the sensed intensity of ambient light source and the first threshold value and the second threshold value. In another embodiment of the invention, when the electronic device is operated relying on the external power, image control unit 104 would determine the image luminance value of the image signal IM without considering the relation between the sensed intensity of ambient light source and the first threshold value and the second threshold value. In other words, the image control unit 104 can find out the luminance value corresponding to the first image data ID1 of the image signal IM (corresponding to a first luminance reference value) according to the intensity signal IN and find out the luminance value corresponding to the first image data ID1 of the image signal IM (corresponding to a second luminance reference value) according to the image analysis signal IA, followed by determining the final luminance value corresponding to the first image data ID1 of the image signal IM according to the first luminance reference value and the second luminance reference value.

In the embodiment, the image control unit 104 can set the image luminance value of the image signal IM to the sum of the first luminance reference value and the second luminance reference value. In other embodiments, the image control unit 104 can set the image luminance value of the image signal IM to the sum of the first luminance reference value and the second luminance reference value respectively timed by a weight. It should be noted that the weights of the first luminance reference value and the second luminance reference value can be adjusted according to the real demand.

Figure 4:
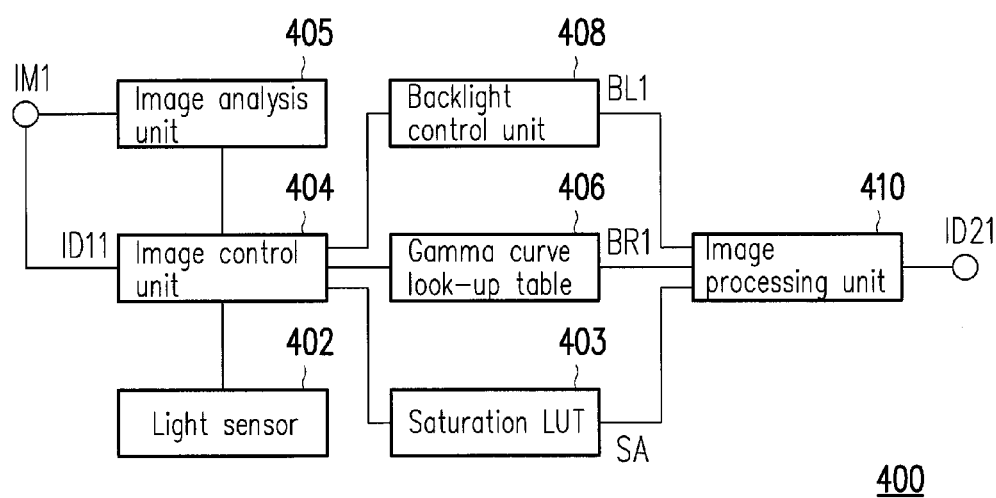
FIG. 4 is a schematic diagram of an image processing circuit in another embodiment of the invention.

FIG. 4 is a schematic diagram of an image processing circuit 400 in another embodiment of the invention. The image processing circuit 400 includes a light sensor 402, a saturation LUT 403, an image control unit 404, an image analysis unit 405, a Gamma curve LUT 406, a backlight control unit 408 and an image processing unit 410. The operations of the light sensor 402, the image control unit 404, the image analysis unit 405, the Gamma curve LUT 406, the backlight control unit 408 and the image processing unit 410 can refer to the light sensor 102, the image control unit 104, the image analysis unit 105, the Gamma curve LUT 106, the backlight control unit 108 and the image processing unit 110 in the image processing circuit 100, which is omitted to describe.

In comparison with the image processing circuit 100, the image processing circuit 400 further includes the saturation LUT 403. The saturation LUT 403 is coupled to the image control unit 404 and outputs a saturation signal SA corresponding to the image luminance value. The image processing unit 410 outputs a second image data ID21 corresponding to a first image data ID11 according to a luminance value signal BR1, a backlight luminance signal BL1 and the saturation signal SA. In the embodiment, the image processing unit 410 outputs the second image data ID21 according to the saturation signal SA so as to set the saturation corresponding to the second image data ID21 according to the saturation signal SA.

Figure 5:
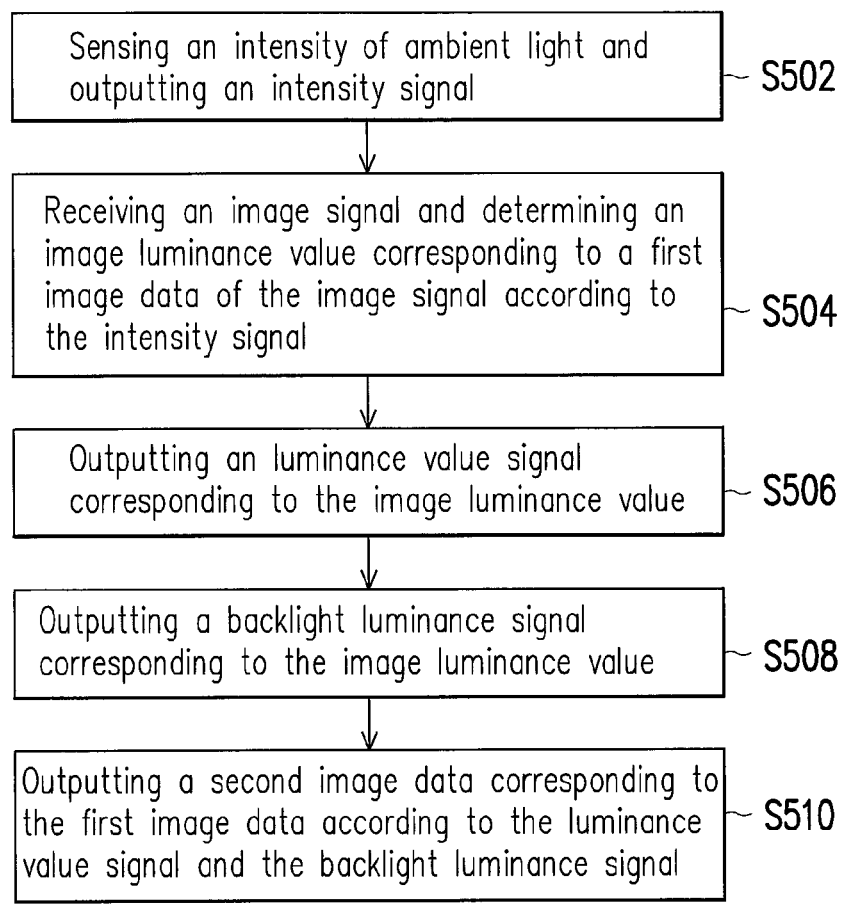
FIG. 5 is a flowchart of an image processing method in an embodiment of the invention.

FIG. 5 is a flowchart of an image processing method in an embodiment of the invention. Referring to FIG. 5, in the embodiment, the image processing method includes following steps: sensing an intensity of ambient light and outputting an intensity signal (step S502); receiving an image signal and determining an image luminance value corresponding to a first image data of the image signal according to the intensity signal (step S504); outputting an luminance value signal corresponding to the image luminance value (step S506); outputting a backlight luminance signal corresponding to the image luminance value (step S508); and outputting a second image data corresponding to the first image data according to the luminance value signal and the backlight luminance signal (step S510). The details of steps S502-S510 can refer to the embodiments of FIGS. 2A-2D and 4.

Figure 6:
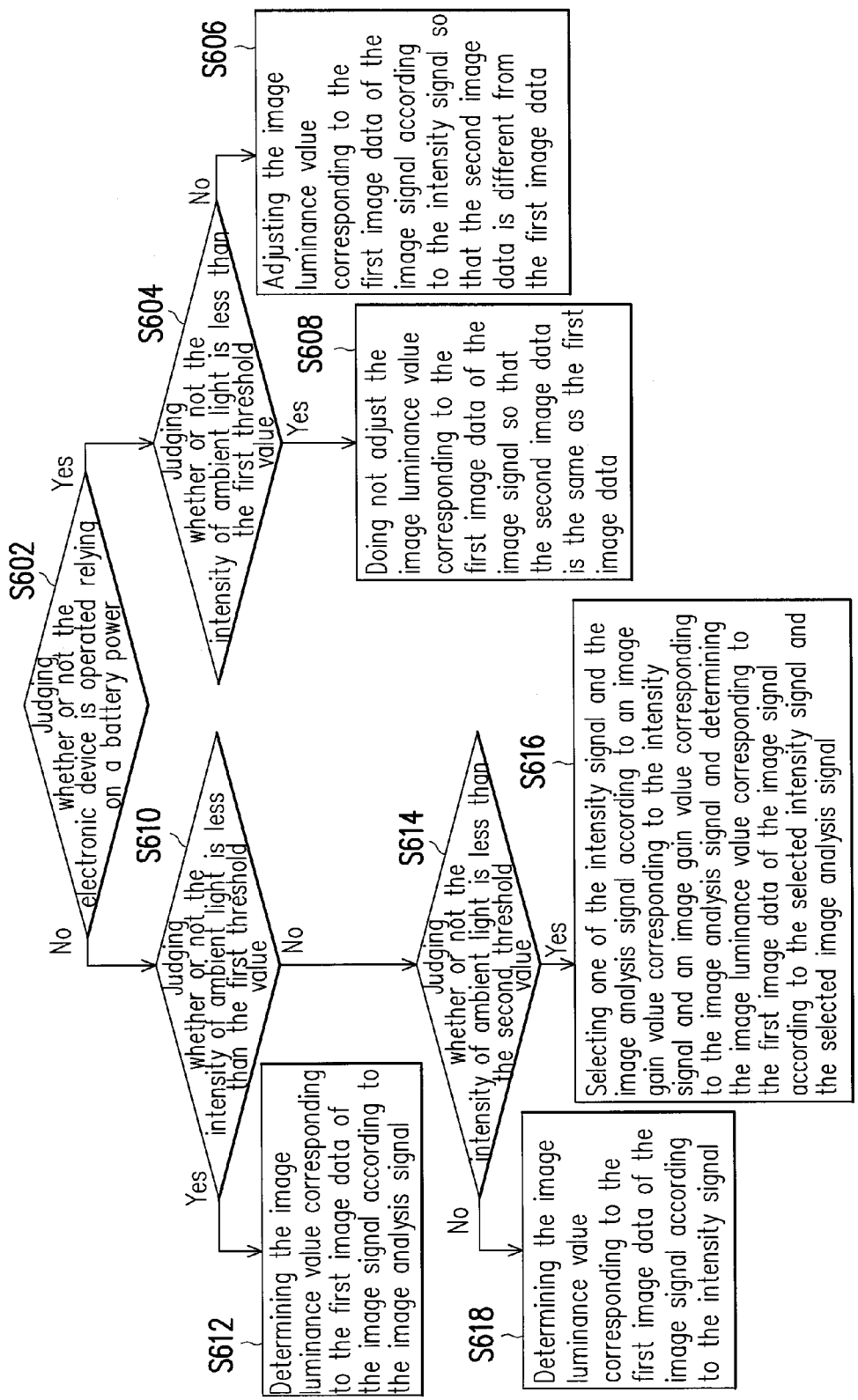
FIG. 6 is a flowchart of an image processing method in another embodiment of the invention.

FIG. 6 is a flowchart of an image processing method in another embodiment of the invention and FIG. 6 can be seen as the detail flowchart of step S504 in FIG. 5. Referring to FIG. 6, in the embodiment, the image processing method includes following steps. It judges whether or not the electronic device is operated relying on a battery power (step S602). When the electronic device is operated relying on a battery power, i.e., the judgment result of step S602 is "yes", it judges whether or not the intensity of ambient light is less than the first threshold value (step S604). When the intensity of ambient light is greater than or equal to the first threshold value, i.e., the judgment result of step S604 is "no", it adjusts the image luminance value corresponding to the first image data of the image signal according to the intensity signal so that the second image data is different from the first image data (step S606). When the intensity of ambient light is less than the first threshold value, i.e., the judgment result of step S604 is "yes", it does not adjust the image luminance value corresponding to the first image data of the image signal so that the second image data is the same as the first image data (step S608).

On the other hand, when the electronic device is operated relying on an external power, i.e., the judgment result of step S602 is "no", it judges whether or not the intensity of ambient light is less than the first threshold value (step S610). When the intensity of ambient light is less than the first threshold value, i.e., the judgment result of step S610 is "yes", it determines the image luminance value corresponding to the first image data of the image signal according to the image analysis signal (step S612). When the intensity of ambient light is greater than or equal to the first threshold value, i.e., the judgment result of step S610 is "no", it further judges whether or not the intensity of ambient light is less than the second threshold value (step S614). When the intensity of ambient light is greater than or equal to the first threshold value but less than the second threshold value, i.e., the judgment result of step S614 is "yes", it selects one of the intensity signal and the image analysis signal according to an image gain value corresponding to the intensity signal and an image gain value corresponding to the image analysis signal and determines the image luminance value corresponding to the first image data of the image signal according to the selected intensity signal and the selected image analysis signal (step S616). When the intensity of ambient light source is greater than or equal to the second threshold value, i.e., the judgment result of step S614 is "no", it determines the image luminance value corresponding to the first image data of the image signal according to the intensity signal (step S618). The sequence of the aforementioned steps S602-S618 can refer to the embodiments of FIGS. 1, 2A-2D and 4.

In summary, the image processing circuit and the method thereof is able to adaptably determine the image luminance value of the image signal according to the power operation mode of the electronic device and the intensity of ambient light. In addition, the image processing circuit and the method thereof provided by the invention can increase the image quality through adjusting the backlight luminance of the screen and the color saturation of the image signal under different ambient light sources according to the JND of the image signal. In this way, the image processing circuit and the method thereof in the invention can solve the problem for the user to fail clearly viewing the displayed content on the screen of the electronic device under a strong light and advance the quality of the display frame.

It will be apparent to those skilled in the art that the descriptions above are several preferred embodiments of the invention only, which does not limit the implementing range of the invention. Various modifications and variations can be made to the structure of the invention without departing from the scope or spirit of the invention. The claim scope of the invention is defined by the claims hereinafter.

What is claimed is:

1. An image processing circuit, suitable for an electronic device and comprising:
    a light sensor, configured to sense an intensity of ambient light and output an intensity signal;
    an image control unit, coupled to the light sensor and receiving an image signal, wherein the image control unit determines an image luminance value corresponding to a first image data of the image signal according to the intensity signal;
    a Gamma curve look-up table, coupled to the image control unit and controlled by the image control unit to output a luminance value signal corresponding to the image luminance value;
    a backlight control unit, coupled to the image control unit and controlled by the image control unit to output a backlight luminance signal corresponding to the image luminance value; and
    an image processing unit, coupled to the Gamma curve look-up table and the backlight control unit to output a second image data corresponding to the first image data according to the luminance value signal and the backlight luminance signal,
    wherein when the intensity of ambient light source is greater than or equal to a first threshold value and the electronic device is operated according to a battery power, the image control unit determines the image luminance value corresponding to the first image data of the image signal according to the intensity signal and the second image data is different from the first image data; when the intensity of ambient light source is less than the first threshold value and the electronic device is operated according to the battery power, the image control unit determines the image luminance value corresponding to the first image data of the image signal according to the intensity signal and the second image data is the same as the first image data.

2. The image processing circuit as claimed in claim 1, wherein the image control unit determines the image luminance value corresponding to the first image data of the image signal according to a just noticeable difference (JND).

3. The image processing circuit as claimed in claim 1, further comprising:
    a saturation look-up table, coupled to the image control unit and controlled by the image control unit to output a saturation signal corresponding to the image luminance value,
    wherein the image processing circuit outputs the second image data corresponding to the first image data according to the luminance value signal, the backlight luminance signal and the saturation signal.

4. The image processing circuit as claimed in claim 1, wherein when the intensity of ambient light source is greater than or equal to the first threshold value and the electronic device is operated according to the battery power, the image control unit increases the difference between a plurality of low-luminance grayscale values.

5. The image processing circuit as claimed in claim 1, further comprising:
    an image analysis unit, receiving the image signal to analyse an image distribution of the image signal and accordingly provide an image analysis signal,
    wherein the image control unit determines the image luminance value corresponding to the first image data of the image signal according to the intensity signal or the image analysis signal.

6. The image processing circuit as claimed in claim 5, wherein when the intensity of ambient light source is less than a first threshold value and the electronic device is operated according to an external power, the image control unit determines the image luminance value corresponding to the first image data of the image signal according to the image analysis signal; when the intensity of ambient light source is greater than or equal to the first threshold value but less than a second threshold value and the electronic device is operated according to the external power, the image control unit selects one of the intensity signal and the image analysis signal according to an image gain value corresponding to the intensity signal and an image gain value corresponding to the image analysis signal and determines the image luminance value corresponding to the first image data of the image signal according to the selected intensity signal and the selected image analysis signal; when the intensity of ambient light source is greater than or equal to the second threshold value and the electronic device is operated according to the external power, the image control unit determines the image luminance value corresponding to the first image data of the image signal according to the intensity signal.

7. The image processing circuit as claimed in claim 6, wherein the image gain value is determined according to following formula:

$$(OGA/OGM)^{GAL} = (OGA'/OGM)$$

wherein OGM is a maximal grayscale value, OGA is arbitrary grayscale value unequal to the maximal grayscale value, OGA' is adjusted grayscale value and GAL is the image gain value.

8. The image processing circuit as claimed in claim 7, wherein the OGA is a low-luminance grayscale value.

9. The image processing circuit as claimed in claim 6, wherein when the image analysis signal represents that the image signal is a high-luminance image, the image control unit increases the difference between a plurality of high-luminance grayscale values; when the image analysis signal represents that the image signal is a middle-luminance image, the image control unit increases the difference between a plurality of middle-luminance grayscale values; when the image analysis signal represents that the image signal is a low-luminance image, the image control unit increases the difference between a plurality of low-luminance grayscale values.

10. The image processing circuit as claimed in claim 5, wherein when the electronic device is operated according to an external power, the image control unit determines a first luminance reference value corresponding to the first image data of the image signal according to the intensity signal, determines a second luminance reference value corresponding to the first image data of the image signal according to the image analysis signal and determines the image luminance value corresponding to the first image data according to the first luminance reference value and the second luminance reference value.

11. The image processing circuit as claimed in claim 10, wherein the image luminance value is average value of the first luminance reference value and the second luminance reference value.

12. The image processing circuit as claimed in claim 10, wherein the image luminance value is sum of the first luminance reference value and the second luminance reference value after being respectively timed by a weight.

13. An image processing method, suitable for an electronic device and comprising following steps:
    sensing an intensity of ambient light and outputting an intensity signal;
    receiving an image signal and determining an image luminance value corresponding to a first image data of the image signal according to the intensity signal;
    outputting a luminance value signal corresponding to the image luminance value;
    outputting a backlight luminance signal corresponding to the image luminance value; and
    outputting a second image data corresponding to the first image data according to the luminance value signal and the backlight luminance signal,
    wherein the step of determining the image luminance value corresponding to the first image data of the image signal according to the intensity signal comprises:
    when the intensity of ambient light is greater than or equal to a first threshold value and the electronic device is operated according to a battery power, determining the image luminance value corresponding to the first image data of the image signal according to the intensity signal, wherein the second image data is different from the first image data; and
    when the intensity of ambient light is less than the first threshold value and the electronic device is operated according to the battery power, determining the image luminance value corresponding to the first image data of the image signal according to the intensity signal, wherein the second image data is the same as the first image data.

14. The image processing method as claimed in claim 13, wherein the step of determining the image luminance value corresponding to the first image data of the image signal according to the intensity signal comprises:
    determining the image luminance value corresponding to the first image data of the image signal according to a just noticeable difference (JND).

15. The image processing method as claimed in claim 13, further comprising:
    outputting a saturation signal corresponding to the image luminance value, and outputting the second image data corresponding to the first image data according to the luminance value signal, the backlight luminance signal and the saturation signal.

16. The image processing method as claimed in claim 13, wherein when the intensity of ambient light is greater than or equal to the first threshold value and the electronic device is operated according to the battery power, increasing the difference between a plurality of low-luminance grayscale values.

17. The image processing method as claimed in claim 13, further comprising:
    receiving the image signal to analyse an image distribution of the image signal and accordingly providing an image analysis signal; and
    determining the image luminance value corresponding to the first image data of the image signal according to the intensity signal or the image analysis signal.

18. The image processing method as claimed in claim 17, wherein the step of determining the image luminance value corresponding to the first image data of the image signal according to the intensity signal or the image analysis signal comprises:
    when the intensity of ambient light is less than a first threshold value and the electronic device is operated according to the an external power, determining the image luminance value corresponding to the first image data of the image signal according to the image analysis signal;
    when the intensity of ambient light is greater than or equal to the first threshold value but less than a second threshold value and the electronic device is operated according to the external power, selecting one of the intensity signal and the image analysis signal according to an image gain value corresponding to the intensity signal and an image gain value corresponding to the image analysis signal and determining the image luminance value corresponding to the first image data of the image signal according to the selected intensity signal and the selected image analysis signal; and
    when the intensity of ambient light is greater than or equal to the second threshold value and the electronic device is operated according to the external power, determining the image luminance value corresponding to the first image data of the image signal according to the intensity signal.

19. The image processing method as claimed in claim 18, wherein the image gain value is determined according to following formula:

$$(OGA/OGM)^{GAL}=(OGA'/OGM)$$

wherein OGM is a maximal grayscale value, OGA is arbitrary grayscale value unequal to the maximal grayscale value, OGA' is adjusted grayscale value and GAL is the image gain value.

20. The image processing method as claimed in claim 19, wherein the OGA is a low-luminance grayscale value.

21. The image processing method as claimed in claim 18, wherein the step of determining the image luminance value corresponding to the first image data of the image signal according to the image analysis signal comprises:
   when the image analysis signal represents that the image signal is a high-luminance image, increasing the difference between a plurality of high-luminance grayscale values;
   when the image analysis signal represents that the image signal is a middle-luminance image, increasing the difference between a plurality of middle-luminance grayscale values; and
   when the image analysis signal represents that the image signal is a low-luminance image, increasing the difference between a plurality of low-luminance grayscale values.

22. The image processing method as claimed in claim 17, wherein the step of determining the image luminance value corresponding to the first image data of the image signal according to the intensity signal or the image analysis signal comprises:
   when the electronic device is operated according to an external power, determining a first luminance reference value corresponding to the first image data of the image signal according to the intensity signal, determining a second luminance reference value corresponding to the first image data of the image signal according to the image analysis signal and determining the image luminance value corresponding to the first image data according to the first luminance reference value and the second luminance reference value.

23. The image processing method as claimed in claim 22, wherein the image luminance value is average value of the first luminance reference value and the second luminance reference value.

24. The image processing method as claimed in claim 22, wherein the image luminance value is sum of the first luminance reference value and the second luminance reference value after being respectively timed by a weight.

* * * * *